(12) United States Patent
Hazra et al.

(10) Patent No.: US 10,534,815 B2
(45) Date of Patent: Jan. 14, 2020

(54) CUSTOMIZED KEYWORD QUERY SUGGESTIONS ON ONLINE SOCIAL NETWORKS

(71) Applicant: Facebook, Inc., Menlo Park, CA (US)

(72) Inventors: Kurchi Subhra Hazra, Mountain View, CA (US); Vineel Pratap Konduru, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 288 days.

(21) Appl. No.: 15/251,909

(22) Filed: Aug. 30, 2016

(65) Prior Publication Data

US 2018/0060340 A1    Mar. 1, 2018

(51) Int. Cl.
*G06F 17/30* (2006.01)
*G06F 16/9032* (2019.01)

(52) U.S. Cl.
CPC .............................. *G06F 16/90324* (2019.01)

(58) Field of Classification Search
USPC .................................. 707/728, 759, 748, 721
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,752,326 B2 | 7/2010 | Smit | |
| 7,783,630 B1 | 8/2010 | Chevalier | |
| 7,797,635 B1 | 9/2010 | Denise | |
| 7,836,044 B2 | 11/2010 | Kamvar | |
| 8,027,990 B1 | 9/2011 | Mysen | |
| 8,055,673 B2 | 11/2011 | Churchill | |
| 8,060,639 B2 | 11/2011 | Smit | |
| 8,082,278 B2 | 12/2011 | Agrawal | |
| 8,112,529 B2 | 2/2012 | Van Den Oord | |
| 8,135,721 B2 | 3/2012 | Joshi | |
| 8,145,636 B1 | 3/2012 | Jeh | |
| 8,180,804 B1 | 5/2012 | Narayanan | |
| 8,185,558 B1 | 5/2012 | Narayanan | |
| 8,209,330 B1 | 6/2012 | Covell | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |

(Continued)

*Primary Examiner* — Hung T Vy
(74) *Attorney, Agent, or Firm* — Baker Botts L.L.P.

(57) ABSTRACT

In one embodiment, a method includes accessing multiple posts of an online social network, each post being associated with a first entity of the online social network. The method also includes generating multiple candidate keywords by extracting one or more n-grams from content of the accessed posts and calculating a rank for each candidate keyword. The method also includes storing one or more candidate keywords in association with the first entity, each stored candidate keyword having a calculated rank higher than a threshold rank and sending, to a second entity of the online social network, one or more suggested queries associated with the first entity for display on the client system, each suggested query comprising one or more of the stored candidate keywords associated with the first entity.

20 Claims, 8 Drawing Sheets

(56) References Cited

U.S. PATENT DOCUMENTS

| | | | |
|---|---|---|---|
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1* | 2/2015 | Garg | H04L 67/10 707/748 |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184936 A1* | 7/2011 | Lymberopoulos | G06F 16/9574 707/721 |
| 2011/0184981 A1 | 7/2011 | Lu |
| 2011/0191371 A1 | 8/2011 | Elliott |
| 2011/0196855 A1 | 8/2011 | Wable |
| 2011/0213655 A1* | 9/2011 | Henkin | G06Q 30/00 705/14.49 |
| 2011/0231296 A1 | 9/2011 | Gross |
| 2011/0252027 A1* | 10/2011 | Chen | G06F 17/30525 707/728 |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2013/0304818 A1* | 11/2013 | Brumleve | H04L 67/02 709/204 |
| 2014/0006416 A1 | 1/2014 | Leslie |

(56) References Cited

U.S. PATENT DOCUMENTS

| | | | |
|---|---|---|---|
| 2014/0040371 A1* | 2/2014 | Gurevich | H04W 4/21 709/204 |
| 2014/0067535 A1 | 3/2014 | Rezaei | |
| 2014/0122465 A1 | 5/2014 | Bilinski | |
| 2014/0280080 A1 | 9/2014 | Solheim | |
| 2014/0304429 A1 | 10/2014 | Softky | |
| 2014/0324963 A1* | 10/2014 | Sankar | G06F 16/24575 709/204 |
| 2015/0074289 A1 | 3/2015 | Hyman | |
| 2015/0127591 A1* | 5/2015 | Gupta | G06N 5/04 706/12 |
| 2015/0161519 A1 | 6/2015 | Zhong | |
| 2016/0026727 A1 | 1/2016 | Bar-Yossef | |
| 2016/0063093 A1 | 3/2016 | Boucher | |
| 2016/0162502 A1 | 6/2016 | Zhou | |
| 2016/0203238 A1 | 7/2016 | Cherniavskii | |

* cited by examiner

CUSTOMIZED KEYWORD QUERY SUGGESTIONS ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may provide customized keyword query suggestions related to particular entities of an online social network to a querying user. A user interface associated with the social-networking system may comprise fields for displaying one or more query suggestions associated with each search instance. Instead of typing in a complete search query into a query field, a user may conduct a search against the online social network by, for example, clicking on one of the query suggestions. The efficiency of searching may be improved if the displayed query suggestions are customized to fit the user's interests, such that the user's probability of using at least one of the query suggestions is increased. Query suggestions may be generated based on keywords extracted from a variety of sources such as, for example, a search history associated with the querying user, content associated with the querying user, or a plurality of trending or popular topics on the online social network. Additionally, query suggestions may be generated based on keywords extracted from content associated with entities other than the querying user. The social-networking system may customize its query suggestions to fit the interests of the querying user by providing query suggestions associated with one or more entities that the querying user is interested in. For example, a querying user, who is a friend of the user "Xiao" on the online social network, may be visiting a profile interface associated with Xiao and decide to conduct a search from the current profile interface. The social-networking system may then provide a list of suggested queries to the querying user, each suggested query incorporating one or more keywords extracted from Xiao's posts.

In particular embodiments, the social-networking system may first access and extract one or more n-grams from posts associated with a first entity. The first entity may be, for example, a user, a group of users, an organization, a place, a website, or another suitable entity associated with the online social network. Posts associated with the first entity may include data such as, for example, status updates or other textual data, location information, photos, videos, links, music, other suitable data or media, or any combination thereof. The social-networking system may then generate one or more keywords (e.g., words, phrases, other suitable text strings) based on the extracted n-grams and store the keywords on a server or a client system. The stored keywords may then be used to generate one or more query suggestions, which may be provided to a querying user determined to be potentially interested in the first entity.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
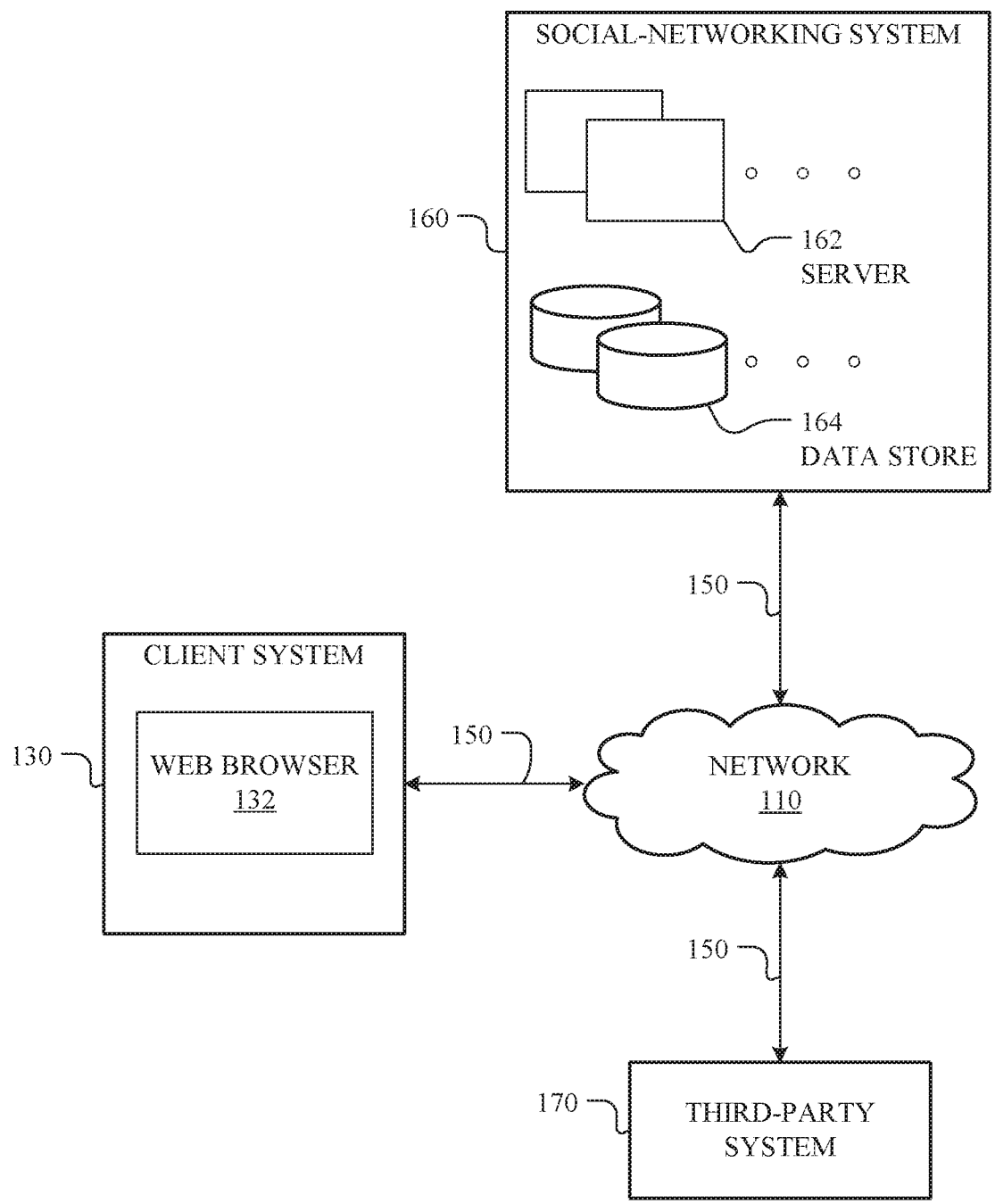
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
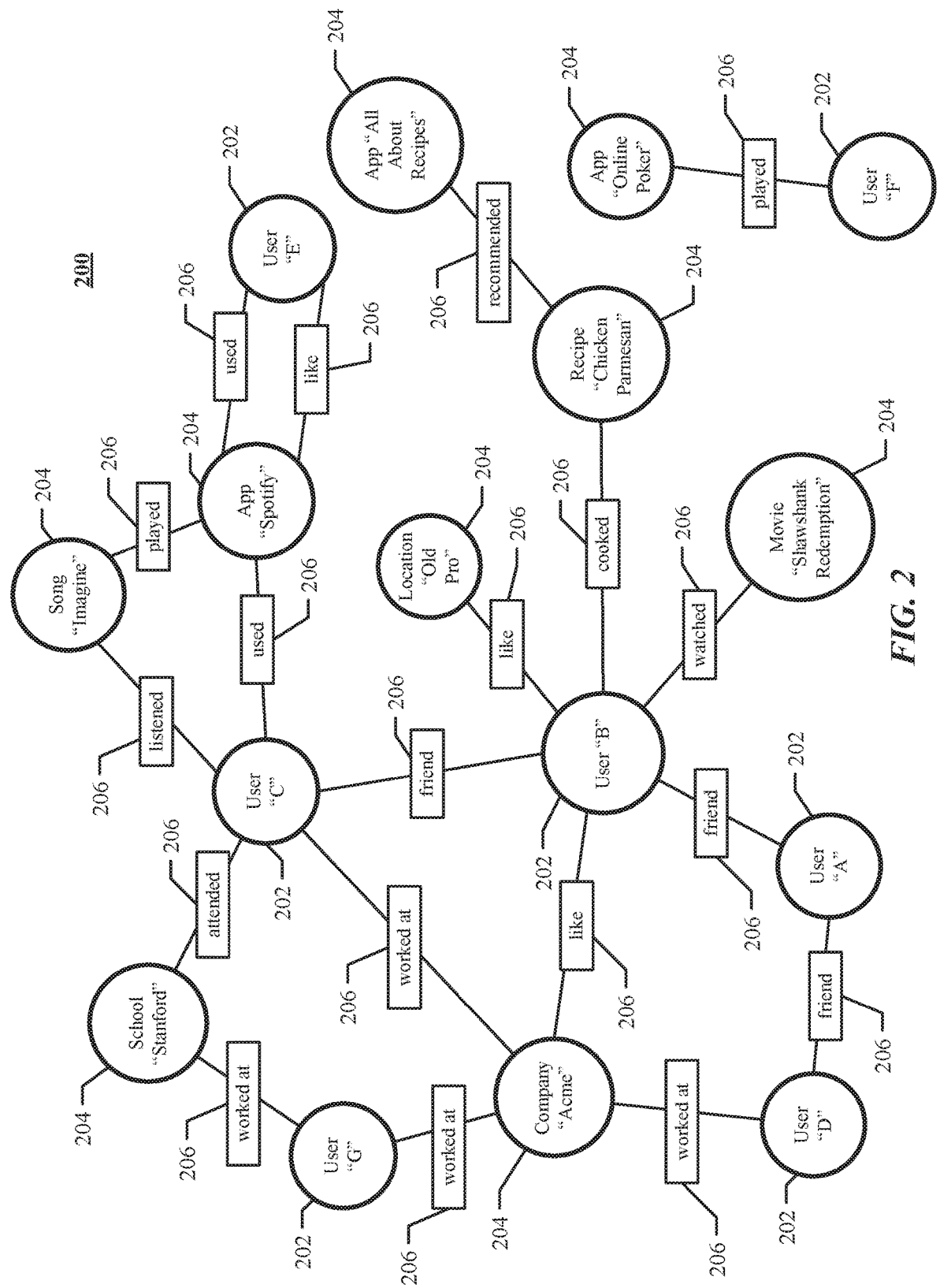
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, U.S. patent application Ser. No. 13/556,072, filed 23 Jul. 2012, U.S. patent application Ser. No. 14/470,607, filed 27 Aug. 2014, U.S. patent application Ser. No. 14/561,418, filed 5 Dec. 2014, and U.S. patent application Ser. No. 14/592,988, filed 9 Jan. 2015, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-type

Figure 3:
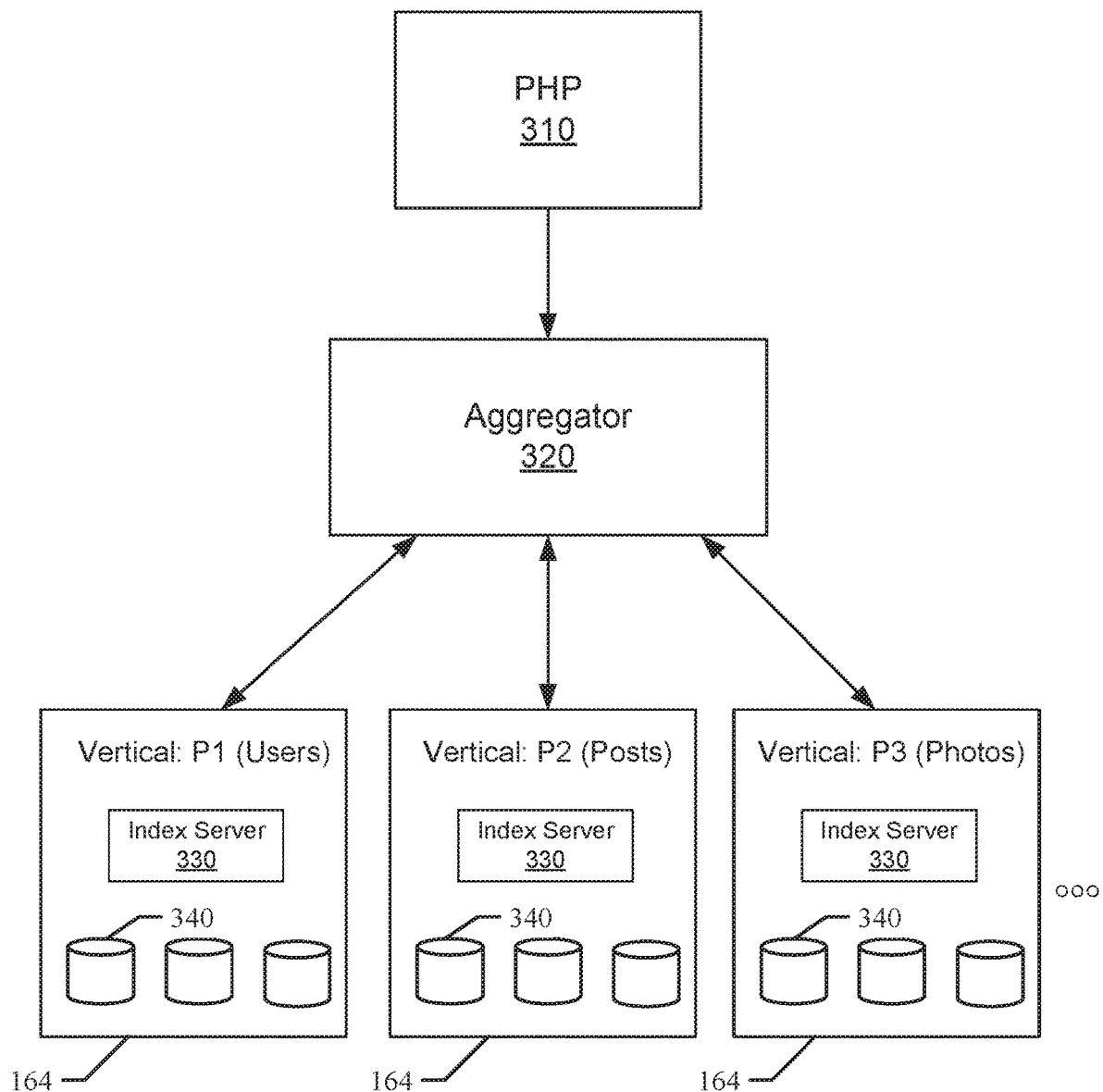
FIG. 3 illustrates an example partitioning for storing objects of social-networking system 160.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned by based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request (step 303). In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723, 861, filed 21 Dec. 2012, and U.S. patent application Ser. No. 13/870,113, filed 25 Apr. 2013, each of which is incorporated by reference.

Customized Keyword Query Suggestions

In particular embodiments, the social-networking system 160 may provide customized keyword query suggestions related to particular entities of the online social network. The social-networking system 160 may generate keywords (e.g., words, phrases, other suitable text strings) by extracting n-grams from posts associated with a first entity, store the keywords, and use the stored keywords to generate keyword query suggestions associated with the first entity. The keyword query suggestions may then be provided to a second entity (e.g., a user conducting a search) of the online social network to facilitate the second entity's search related to the first entity. Here, an entity may be a user, a group of users, an organization, a place, a website, or another suitable entity, which is capable of being represented in the social-networking system 160 or a third-party system 170. The social graph 200 may comprise a plurality of entity nodes corresponding to a plurality of entities associated with the online social network, including the first entity and the second entity. Posts associated with the first entity may include data such as, for example, status updates or other textual data, location information, photos, videos, links, music, other suitable data or media, or any combination thereof. The social graph 200 may comprise a plurality of content nodes corresponding to a plurality of posts (or other content) on the online social network, including posts of the first entity. Each content node may be connected to one or more of the entity nodes by one or more edges 206 on the social graph 200. As an example and not by way of limitation, a querying user, who is a friend of the user "Xiao" on the online social network, may be visiting a profile interface associated with Xiao and decide to conduct a search from the current profile interface. The social-networking system 160 may have extracted a plurality of n-grams from one or more posts associated with Xiao, and generated, ranked, and cached a set of keywords in relation to Xiao ahead of time. The social-networking system 160 may then provide a list of suggested keyword queries to the querying user, each suggested keyword query incorporating one or more of the top-ranked keywords. The querying user may be able to select and use one of the suggested keyword queries to conduct a search, which may retrieve one or more posts or content objects of other types associated with Xiao. As another example and not by way of limitation, a querying user, who follows a public figure "Mark" on the online social network, may conduct a search from a newsfeed interface of the querying user. The querying user may type a string or partial query "Mar" in a query field. The social-networking system 160 may use one or more matching algorithms (e.g., matching algorithms used in the typeahead processes described previously) to identify entities of the online social network that match this partial query. The entity Mark may be identified as such a match. The social-networking system 160 may then provide a list of suggested keyword queries for the querying user to select and use, each suggested keyword query incorporating one or more keywords generated based on posts associated with Mark. The embodiments described herein may enable the social-networking system 160 to provide suggested queries that are customized for particular entities and, at the same time, may reduce or eliminate the chance that a suggested query provided by the social-networking system 160 retrieves a set comprising no results (e.g., a null set). Although this disclosure describes providing particular customized keyword query suggestions related to particular entities in a particular manner, this disclosure contemplates providing any suitable customized keyword query suggestions related to any suitable entities in any suitable manner.

In particular embodiments, the social-networking system 160 may access a plurality of posts of an online social network. Each post may be associated with a particular entity of the online social network. The posts may be stored in one or more data stores 164 of the social-networking system 160. The social-networking system 160 may identify a plurality of entities of the online social network for which to generate keyword query suggestions. The identified entities may include all entities of the online social network, or a selected subset of entities. They may be chosen based on, for example, a number of posts associated with each entity, a frequency of activity of the entity on the online social network (e.g., how frequently a user posts), a frequency that information about each entity is being searched, another suitable factor, or any combination thereof. The social-networking system 160 may access the posts associated with the particular entity offline according to a specified schedule (e.g., once a day). Alternatively, the social-networking system 160 may access a new post of the particular entity offline whenever the new post is made available on the online social network. The social-networking system 160 may also access posts of the particular entity in real time, when it is necessary to provide keyword query suggestions related to the particular entity (e.g., responsive to a user accessing a profile page of the particular entity). As an example and not by way of limitation, the social-networking system 160 may determine that the public figure Mark is popular on the online social network and that it is desirable to generate keyword query suggestions in relation to Mark. The social-networking system 160 may place a listener on a profile interface associated with Mark, wherein the listener may monitor and report, to the social-networking system 160, events occurring in relation to the profile interface. The social-networking system 160 may then access each post on the profile interface, in response to a report from the listener, as soon as the post is made available there. As another example and not by way of limitation, the social-networking system 160 may provide keyword query suggestions for all entities of the online social network, including the entity Xiao. The social-networking system 160 may access all posts associated with Xiao once a day to detect newly-created posts. If so, the social-networking system 160 may access any such newly-created posts.

In particular embodiments, the accessed posts may comprise posts generated within a specified timeframe. The social-networking system 160 may select posts to access based on specified rules. The rules may be guided by both an interest in using only the most relevant posts and an interest in ensuring a sufficiently large corpus from which to extract keywords. The rules may be time-based. For a particular entity, the social-networking system 160 may be configured to access only posts associated with the entity that are generated in a particular time period. The timeframe may be uniform with respect to all entities of the online social network or be specifically determined for each entity or each type of entities. As an example and not by way of limitation, the social-networking system 160 may access only posts associated with Xiao that are made available on the online social network within three months before the time of access. As another example and not by way of limitation, the public figure Mark may be more active on the online social network than Xiao. Accordingly, the social-networking system 160 may access posts associated with Mark that are generated within narrower time period (e.g., the past one week), which still allows for a sufficiently large corpus of posts from which to extract keywords.

In particular embodiments, the number of posts accessed by the social-networking system 160 may be the smaller of a specified number of posts or a total number of posts associated with a particular entity of the online social network. In order to ensure a sufficiently large corpus from which to extract keywords, the social-networking system 160 may be configured to access a specified minimum number of posts associated with each entity. This specified minimum number may be uniform with respect to all entities of the online social network or be specifically determined for each entity or each type of entities. It may be pre-determined as a target or dynamically generated. For a particular entity, if a total number of posts associated with the entity is smaller than the specified minimum number (e.g., because the user is a new user of the online social network, or an infrequent poster on the online social network), the social-networking system 160 may access all posts associated with the entity to obtain a corpus that is as large as possible. Configurations about the number of posts to access may be combined with configurations about the timeframe associated with accessed posts. For example, for a particular entity, the social-networking system 160 may be configured to access posts generated in relation to the entity within a specified time period if and only if the number of posts generated in this period exceeds a specified minimum number. Otherwise, the social-networking system 160 may access the minimum number of most recent posts associated with the entity regardless of whether each post is generated within the specified period (or a total number of posts associated with the entity if this total number is smaller than the specified minimum number). As an example and not by way of limitation, the social-networking system 160 may be configured to access a minimum number of 30 posts associated with an ordinary user, such as Xiao, of the online social network. Because there are only 25 posts associated with Xiao on the online social network, the social-networking system 160 may access all posts of Xiao regardless of the time each accessed post was generated. As another example and not by way of limitation, the social-networking system 160 may be configured to access a minimum number of 100 posts associated with a public figure, such as Mark. It may be determined that 2000 posts have been generated in relation to Mark within a specified timeframe (e.g., the past one year). Because this number exceeds the specified minimum number, the social-networking system 160 may only access the posts within the specified timeframe. Alternatively, the social-networking system 160 may only access 100 most recent posts associated with Mark.

In particular embodiments, the accessed posts related to a particular entity may include posts authored by the particular entity, posts authored by one or more other entities within a threshold degree of separation of the particular entity in the social graph, posts added to the online social network by one or more other entities referencing the particular entity, or posts added to a profile interface of the particular entity on the online social network by one or more other entities. The scope of posts to access may be uniform with respect to all entities of the online social network or be specifically determined for each entity or each type of entities. For a particular entity, the social-networking system 160 may determine a scope of posts to access. This determination may be based on, for example, a number of each type of posts associated with the entity, the relevance of each type of posts to the entity, the cost or difficulty in accessing each type of posts, another suitable factor, or any combination thereof. As an example and not by way of limitation, the social-networking system 160 may be configured to preferentially access posts authored by a particular entity, which may be most relevant to the entity. Xiao, however, may have only authored 5 posts during her entire history of using the online social network. In order to obtain a sufficiently large corpus from which to generate keywords associated with Xiao, the social-networking system 160 may extend the scope of access to other types of posts, such as posts authored by Xiao's friends on the online social network and posts referencing Xiao. As another example and not by way of limitation, there may be a large number of posts added to the online social network by third-party entities referencing the public figure Mark. The social-networking system 160 may only access posts that are added to a profile interface of Mark with Mark's permission. Although this disclosure describes accessing particular posts of an online social network in a particular manner, this disclosure contemplates accessing any suitable posts of an online social network in any suitable manner.

In particular embodiments, the social-networking system 160 may generate a plurality of candidate keywords for suggested queries by extracting one or more n-grams from content of the accessed posts. The candidate keywords may be generated prior to a search attempt by a querying user via an offline process (e.g., pre-generated) or in response to a query in real time (e.g., dynamically generated in response to a user accessing a query field or inputting a query). The social-networking system 160 may extract the n-grams using a phrase-extraction algorithm. The phrase-extraction algorithm may function based on one or more rules, one or more of which may be associated with language features such as sentence structures and word types. The social-networking system 160 may extract one or more n-grams from each of one or more of the accessed posts and aggregate the extracted n-grams to form a pool of candidate keywords. Alternatively, the social-networking system 160 may combine the content of the accessed posts into a corpus and directly generate one or more candidate keywords by extracting n-grams from the corpus. As an example and not by way of limitation, the entity Xiao may have posted a status update "Look at my new Tesla" after purchasing a Tesla car. The social-networking system 160 may analyze the text string and determine that the n-gram "Tesla" is the only noun in this one-sentence status update. It may generate a candidate keyword "Tesla" by extracting the n-gram from Xiao's status update. As another example and not by way of limitation, the social-networking system 160 may combined all content from posts associated with Mark within a specified timeframe into a corpus and determine that the n-gram "oculus" appears multiple times in the corpus. Based on this determination, the social-networking system 160 may generate the keyword "oculus" by extracting the n-gram from the corpus. In connection with keyword extraction and generation, particular embodiments may utilize one or more systems, components, elements, functions, methods, operations, or steps disclosed in U.S. patent application Ser. No. 14/797,819, filed 13 Jul. 2015 and U.S. patent application Ser. No. 14/938,685, filed 11 Nov. 2015, each of which is incorporated by reference.

In particular embodiments, generating the plurality of candidate keywords may comprise extracting one or more n-grams from the content of the accessed posts, calculating a relevance score for each extracted n-gram based on TF-IDF analysis, and generating a candidate keyword corresponding to each n-gram having a calculated relevance score greater than a threshold relevance score. As an example and not by way of limitation, the social-networking system 160 may extract 10 n-grams from the content of Xiao's posts and perform TF-IDF analysis on the extracted n-grams. The 10 extracted n-grams may each be assigned a relevance score on a scale from 0 to 1. The social-networking system 160 may then generate a candidate keyword for each extracted n-gram that has a relevance score higher than 0.5.

In particular embodiments, generating the plurality of candidate keywords may further comprise accessing one or more images associated with each of one or more of the accessed posts, identifying one or more n-grams corresponding to one or more features of each accessed image, and generating a candidate keyword for each of one or more of the identified n-grams. A media item may be translated into text by using software to recognize text within the media item. For a particular image file comprising an image, the social-networking system 160 may analyze image characteristics such as pixel values or gradients to determine shapes. The social-networking system 160 may then recognize persons (e.g., a particular user of the online social network) or concepts (e.g., the Eiffel Tower) that the image represents and thereby translate the image into text describing the person (e.g., a name of the user, "John Smith," descriptors of the user, "male," "26-year-old") or text describing the concept (e.g., "Eiffel Tower," "France"). For a particular image file comprising text (e.g., a scanned image of a document), the social-networking system 160 may use optical-character-recognition software to recognize text within the file. As an example and not by way of limitation, Xiao may have posted a photo of herself on the online social network along with the comment "See where I am." The photo may be taken in France and may have the Eiffel Tower as background. The social-networking system 160 may recognize the unique shape of the Eiffel Tower as a feature of the photo and identify the n-gram "Eiffel Tower" based on this feature, even though the n-gram "Eiffel Tower" may not literally appear in any text posted by Xiao. More information about analyzing images to recognize persons or concepts may be found in U.S. patent application Ser. No. 13/959,446, filed 5 Aug. 2013, and U.S. patent application Ser. No. 14/983,385, filed 29 Dec. 2015, which are incorporated by reference. Although this disclosure describes generating candidate keywords in a particular manner, this disclosure contemplates generating candidate keywords in any suitable manner.

In particular embodiments, the social-networking system 160 may calculate a rank for each candidate keyword based at least in part on a number of social signals associated with the post from which the n-gram corresponding to the candidate keyword was extracted. A number of candidate keywords generated by extracting n-grams from posts associated with a particular entity may exceed a number of keyword query suggestions that can be stored or provided in association with the particular entity. This may necessitate ranking the candidate keywords, such that one or more candidate keywords (e.g., those determined to be most helpful or relevant) may be selected to be presented to a querying user. The rank for each candidate keyword may correspond to a priority for being presented to a querying user as part of a keyword query suggestion. A candidate keyword with a higher rank may be more likely to be suggested to a querying user or be presented in a more noticeable position of a user interface associated with the online social network than a candidate keyword with a lower rank. Calculating the rank for each candidate keyword may be based on a variety of factors, including, for example, social signals, language features, recency, repetition, other suitable factors, or any combination thereof. In particular embodiments, the social signals associated with each post may comprise an accessing or viewing of the post, a comment on the post, a sharing of the post, a liking of the post, a liking of the comment on the post, a liking of the sharing of the post, other suitable social actions on the online social network, or any combination thereof. The social-networking system 160 may access one or more data stores 164 to obtain records of the social signals. The social signals may be filtered based on one or more factors, such as a specified timeframe. As an example and not by way of limitation, the social-networking system 160 may have generated two keywords "Tesla" and "gravitational waves" that are associated with Xiao. The keyword "Tesla" may be extracted from Xiao's status update about her new car, which has been viewed by 100 users, commented on by 15 users, and liked by 50 users. The keyword "gravitational waves" may be extracted from Xiao's comment on a shared article discussing the discovery of gravitational waves, which has been viewed by 90 users, commented on by 5 users, and liked by 30 users. The social-networking system 160 may thereby assign "Tesla" a higher rank than "gravitational waves" because social signals suggest that the post from which "Tesla" was extracted is more socially relevant than the post from which "gravitational waves" was extracted. As another example and not by way of limitation, the social-networking system 160 may have generated two keywords "ai" and "oculus" based on keywords extracted from Mark's posts. Because Mark is a public figure on the online social network, his posts are shared by a large number of other entities. The social-networking system 160 may access social-networking information associated with Mark and determine that the post associated with "ai" has been shared 2,000 times and the post associated with "oculus" has been shared 1,000 times within the past hour. The social-networking system 160 may thereby assign a higher rank to "ai" than "oculus" based on this determination. More information on social signals may be found in U.S. patent application Ser. No. 14/640,461, filed 6 Mar. 2015, which is incorporated by reference.

In particular embodiments, the social-networking system 160 may calculate the rank for each candidate keyword further based on analysis of the candidate keyword according to a language model. The language model may be trained by a training data set comprising a large number of posts of the online social network. The social-networking system 160 may weigh the strength of each candidate keyword based on one or more factors considered by the language model (e.g., a language model score, an IDF score, a TF-IDF score). Particular language models may be capable of deriving a strength of a particular candidate keyword that does not appear in its training data set based on the strengths of the candidate keyword's component n-grams. As an example and not by way of limitation, the social-networking system 160 may have generated the candidate keywords "ai" and "internet.org" based on Mark's posts. Based on a language model used by the social-networking system 160, "ai" may be determined to be stronger than "internet.org" (e.g., at least in part because "ai" appears more often than "internet.org" in a training data set comprising a large number of posts of the online social network). The social-networking system 160 may thereby calculate a higher rank for "ai" than "internet.org." In particular embodiments, the social-networking system 160 may calculate the rank for each candidate keyword further based on a length of the candidate keyword. It may be desirable for the social-networking system 160 to provide keyword query suggestions that have clear and independent meanings rather than ambiguous or incomplete meanings. Therefore, the social-networking system 160 may be configured to preferentially rank candidate keywords that are longer n-grams (e.g., bi-grams, tri-grams) with independent meaning over candidate keywords that are shorter n-grams (e.g., uni-grams) with unclear or ambiguous meaning (e.g., the relevance of a uni-gram as a keyword query suggestion may be unclear because of the uni-gram lacks the context of the content from which it was extracted). As an example and not by way of limitation, the social-networking system 160 may calculate a higher rank for "refugee crisis," which is a bi-gram with a relatively clear and independent meaning, than for "oculus," which is a uni-gram brand name.

In particular embodiments, the social-networking system 160 may calculate the rank for each candidate keyword further based on a time of creation associated with the post from which the n-gram corresponding to the candidate keyword was extracted. It may be the case that content in a post more recently created is more likely to be searched for than content in a post less recently created. As an example and not by way of limitation, the social-networking system 160 may rank the keyword "Tesla" higher than the keyword "gravitational waves" because "Tesla" is extracted from a post more recently added to the online social network by Xiao.

In particular embodiments, calculating the rank for each candidate keyword may comprise determining that a particular candidate keyword appears in a list of trending-topic keywords and up-ranking the particular candidate keyword based on the determination. The social-networking system 160 may generate and maintain a list of trending-topic keywords (e.g., hashtags, known topic phrases) representing popular words or phrases on the online social network. This list may be generated by searching through posts recently added to the online social network and identifying words and phrases that are most frequently used by entities of the online social network. Whether a particular word or phrase may be added to the list may also depend on, for example, the entities that use the word or phrase, a time-based pattern of use, another suitable factor, or any combination thereof. The list of trending-topic keywords may also be customizable for particular entities of the online social network. For example, for a particular querying user, the list of trending-topic keywords may comprise words or phrases that are popular among friends or friends of friends of the particular querying user on the online social network. The list of trending-topic keywords may be updated regularly based on a specified schedule or dynamically based on events occurring on the online social network. As an example and not by way of limitation, the social-networking system 160 may calculate a higher rank for the keyword "gravitational waves" than "Tesla" because the former appears in a list of trending-topic keywords after the recent publication of related scientific discoveries.

In particular embodiments, calculating the rank for each candidate keyword may comprise determining that a particular candidate keyword appears in more than one accessed posts associated with the particular entity of the online social network, calculating a number of accessed posts comprising the candidate keyword, and up-ranking the candidate keyword based on the calculated number of accessed posts. It may be desirable to configure the social-networking system 160 in a way such that, for a particular entity, a word or phrase appearing in multiple posts of the entity is preferentially ranked. As an example and not by way of limitation, Xiao may be excited about her new car and have published 5 posts containing the word "Tesla." She may only have shared one post about the discovery of gravitational waves. Although the keyword "gravitational waves" may be ranked higher than "Tesla" based on other criteria, the social-networking system 160 may nonetheless determine that "Tesla" appears in more than one accessed posts associated with Xiao, calculate that 5 posts comprise the keyword, and up-rank "Tesla" to a higher rank than "gravitational waves."

In particular embodiments, calculating the rank for each candidate keyword may comprise, for a first candidate keyword, determining that one or more n-grams corresponding to a particular number of other candidate keywords, respectively, were extracted from the post from which the n-gram corresponding to the first candidate keyword was extracted, determining that the particular number of other candidate keywords each has a higher rank than the first candidate keyword, and down-ranking the first candidate keyword based on the determinations. It may be desirable to configure the social-networking system 160 in a way such that keywords generated based on a diverse variety of posts associated with a particular entity are provided as part of keyword query suggestions. Doing so may contribute to ensuring that each of the query suggestions retrieves a unique set of results. This may require limiting the number of highly ranked keywords generated based on each post.

The social-networking system 160 may, accordingly, set a cap for each post specifying a maximum number of keywords that may be generated based on the post. Alternatively, the social-networking system 160 may down-rank keywords generated based on a particular post when the post has provided multiple n-grams corresponding to other highly ranked keywords. As an example and not by way of limitation, the social-networking system 160 may have extracted the n-grams "ai," "internet.org," "connectivity," and "free basics" all from one of Mark's posts. Because of the popularity of this post, all four keywords based on the extracted n-grams may be ranked top four based on other ranking criteria. In this situation, the social-networking system 160 may determine that "ai" and "internet.org" are both generated based on the same post as and ranked higher than "connectivity" and "free basics," and down-rank at least "connectivity" and "free basics" accordingly. This allows keywords generated from other posts, such as "refugee crisis" and "oculus," to be provided as part of keyword query suggestions associated with Mark. Although this disclosure describes calculating ranks for candidate keywords in a particular manner, this disclosure contemplates calculating ranks for candidate keywords in any suitable manner.

In particular embodiments, the social-networking system 160 may store one or more candidate keywords in association with the first entity. Each stored candidate keyword may have a calculated rank higher than a threshold rank. Because a large number of candidate keywords may be generated for each entity, it may be costly and inefficient for the social-networking system 160 to store all such candidate keywords. Instead, after ranking the candidate keywords generated in relation to an entity, the social-networking system 160 may only store or cache one or more top-ranked candidate keywords associated with the entity. The threshold rank may depend on the number of candidate keywords the social-networking system 160 stores in association with each entity. This number may be uniform with respect to all entities of the online social network or be specifically determined for each entity or each type of entities. It may be specified based on a number of post-based keyword query suggestions that can be provided in a single instance of search. In particular embodiments, the candidate keywords may be stored in one or more data stores 164 associated with the online social network. Alternatively, they may be stored on a local cache of a client system 130 of the second entity (e.g., a user conducting a search about the entity). The social-networking system 160 may select and rank one or more entities, information associated with which are to be cached on the client system 130 of the second entity. Candidate keywords associated with all or a specified number of top-ranked cached entities may be cached on the client system 130. The selection and ranking of cached entities may be based on, for example, a relationship or affinity coefficient between each entity and the second entity on the online social network, a search history of the second entity, a browsing history of the second entity, another suitable criterion, or any combination thereof. The local cache may be associated with a web browser 132 of the client system 130. The candidate keywords may be stored on the local cache when the client system 130 is turned on, a web page associated with the online social network is opened on the web browser 132, or when an application installed on the client system 130 that is associated with the online social network is opened. Keyword query suggestions associated with the cached entities may be provided to the second entity nearly instantaneously form the local cache. The stored candidate keywords may be updated periodically according to a specified schedule (e.g., once an hour). Alternatively, the stored candidate keywords may be updated dynamically based on one or more types of trigger events (e.g., a new search conducted by the second entity). As an example and not by way of limitation, the social-networking system 160 may have generated and ranked 100 candidate keywords associated with Mark. The social-networking system 160 may store 10 top-ranked candidate keywords associated with Mark in a data store 164 configured to store candidate keywords that are generated based on entities' posts. The social-networking system 160 may monitor a profile interface associated with Mark to detect any new post being added to the profile interface and, upon detection of a new post, update the candidate keywords stored in association with Mark. As another example and not by way of limitation, the social-networking system 160 may select and rank several entities including Xiao, whose information is to be cached on a client system 130 of the second entity. In particular, Xiao may be selected because she has a high affinity coefficient with the second entity and that the second entity recently visited Xiao's profile interface. The social-networking system 160 may store 5 candidate keywords associated with Xiao on a local cache of the client system 130. The 5 cached candidate keywords may be updated every hour. Subsequently, the second entity may conduct a search about one or more other entities. Based on the second entity's activities, the social-networking system 160 may update the entities to be cached on the client system 130, which may no longer include Xiao. The social-networking system 160 may then cause the candidate keywords associated with Xiao to be deleted from the client system 130.

In particular embodiments, each accessed post may be associated with a privacy setting defining a visibility of the post that is visible to at least the second entity. The social-networking system 160 may store, for a particular entity, more than one set of candidate keywords associated with the entity. Each set of candidate keywords may correspond to one or more privacy groups of entities (e.g., friends, friends of friends, public) with respect to the entity associated with the candidate keywords. Different sets may share one or more common candidate keywords. A particular candidate keyword may be placed in one or more sets based on privacy settings associated with the post from which the n-gram corresponding to the candidate keyword was extracted. To enforce the privacy settings, keyword query suggestions being provided to a particular entity may only comprise candidate keywords generated based on n-grams extracted from posts that are visible to the particular entity. As an example and not by way of limitation, the social-networking system 160 may store two sets of candidate keywords in association with Xiao. A first set may comprise 5 candidate keywords each corresponding to an n-gram extracted from posts associated with Xiao that are visible to the public. A second set may comprise 5 candidate keywords each corresponding to an n-gram extracted from posts associated with Xiao that are either visible to the public or visible only to Xiao's friends. It may be the case that one or more top-ranked candidate keywords in the first set are included in the second set. A keyword query suggestion comprising a candidate keyword in the first set may be provided to any entity of the online social network. On the other hand, a keyword query suggestion comprising a candidate keyword in the second set may be provided only to friends of Xiao on the online social network. Although this disclosure describes storing candidate keywords in association with the first entity in a particular manner, this disclosure contemplates storing candidate keywords in association with the first entity in any suitable manner.

In particular embodiments, the social-networking system 160 may send, to a client system 130 of the second entity of the online social network, one or more suggested queries associated with the first entity for display on the client system 130. Each suggested query may comprise one or more of the stored candidate keywords associated with the first entity. Upon determining a need to provide one or more keyword query suggestions, the social-networking system 160 may access one or more stored candidate keywords and generate one or more keyword query suggestions based on the accessed candidate keywords. In particular embodiments, the social-networking system 160 may generate a suggested keyword query by combining a candidate keyword with one or more other n-grams. Specifically, a suggested keyword query may be generated in association with a particular first entity by combining a stored candidate keyword with a reference to the first entity (e.g., "Xiao Tesla"). Alternatively, a suggested keyword query generated by the social-networking system 160 may comprise only a candidate keyword (e.g., "Tesla"). A suggested keyword query may be generated locally on the client system 130 of the second entity and be made available for display on the client system 130. Alternatively, the suggested keyword query may be generated on a server 162 associated with the social-networking system 160 and be sent to the client system 130 of the second entity for display over a network 110. The suggested keyword queries generated based on candidate keywords associated with the first entity may be combined with suggested queries generated based on other sources (e.g., a search history associated with the second entity, content associated with the second entity, trending or popular topics on the online social network) and collectively sent to the client system 130 of the second entity for display. Doing so may allow the second entity to receive a relatively comprehensive set of query suggestions. In particular embodiments, a suggested keyword query may be sent for display on a webpage associated with the online social network accessed by a browser client 132 on the client system 130 of the second entity. The suggested keyword query may alternatively be displayed in a user interface associated with an application corresponding to the social-networking system 160 that is installed on the client system 130 of the second entity. As an example and not by way of limitation, the social-networking system 160 may have caused the second entity's client system 130 to cache a set of candidate keywords associated with Xiao, including the candidate keyword "Tesla." The social-networking system 160 may instruct an application installed on the client system 130 to generate a suggested keyword query "Xiao Tesla" by combining the keyword with a reference to Xiao. The application may then provide this suggested keyword query to the second entity by displaying it in a user interface associated with the application. As another example and not by way of limitation, the social-networking system 160 may have stored a set of candidate keywords associated with the public figure Mark on the online social network, including the candidate keyword "internet.org." The social-networking system 160 may accordingly generate the suggested keyword query "internet.org" and send it to the client device 130 of the second entity for display.

In particular embodiments, the social-networking system 160 may further determine that the second entity is currently accessing, via the client system 130, an interface of the online social network associated with an entity node corresponding to the first entity. If the second entity initiates a search by, for example, clicking on a query field that is part of an interface associated with the first entity, it may be likely that the second entity is interested in searching for content associated with the first entity. Based on the determination, the social-networking system 160 may provide the second entity one or more suggested queries comprising one or more candidate keywords associated with the first entity. As an example and not by way of limitation, the second entity may click on the query field while browsing Xiao's profile interface. In response, the social-networking system 160 may provide, for example, in a dropdown menu, a list of suggested queries comprising candidate keywords associated with Xiao. More information on providing suggested queries based on access of an entity's interface may be found in U.S. patent application Ser. No. 13/732,175, filed 31 Dec. 2012, which is incorporated by reference. In particular embodiments, the social-networking system 160 may further access a search history associated with the second entity, the search history comprising a plurality of queries. At least one of the queries of the search history may be associated with an entity node corresponding to the first entity. It may be the case that an entity tends to conduct searches that are related to the entity's previous searches. The social-networking system 160 may therefore provide keyword query suggestions based on the second entity's search history. As an example and not by way of limitation, the second entity may click on a query field while browsing the second entity's own newsfeed interface, which displays content items (e.g., posts) associated with the second entity's social connections. The social-networking system 160 may access a search history of the second entity, determine that the second entity has recently searched for Xiao and Mark, and provide for display on a client device 130 of the second entity several suggested keyword queries comprising candidate keywords associated with each of Xiao and Mark. In particular embodiments, the social-networking system 160 may further receive, from the client system of the second entity, an unstructured text query, parse the text query to identify one or more n-grams, and determine that at least one of the identified n-grams corresponds to an entity node corresponding to the first entity. As an example and not by way of limitation, the second entity may type, in a query field, the text string "Xia". The social-networking system 160, with its typeahead feature, may parse this partial text query, determine that it corresponds to an entity node associated with the entity Xiao, and provide one or more suggested keyword queries comprising candidate keywords associated with Xiao to the second entity. Although this disclosure describes sending suggested queries for display in a particular manner, this disclosure contemplates sending suggested queries for display in any suitable manner.

Figure 4:
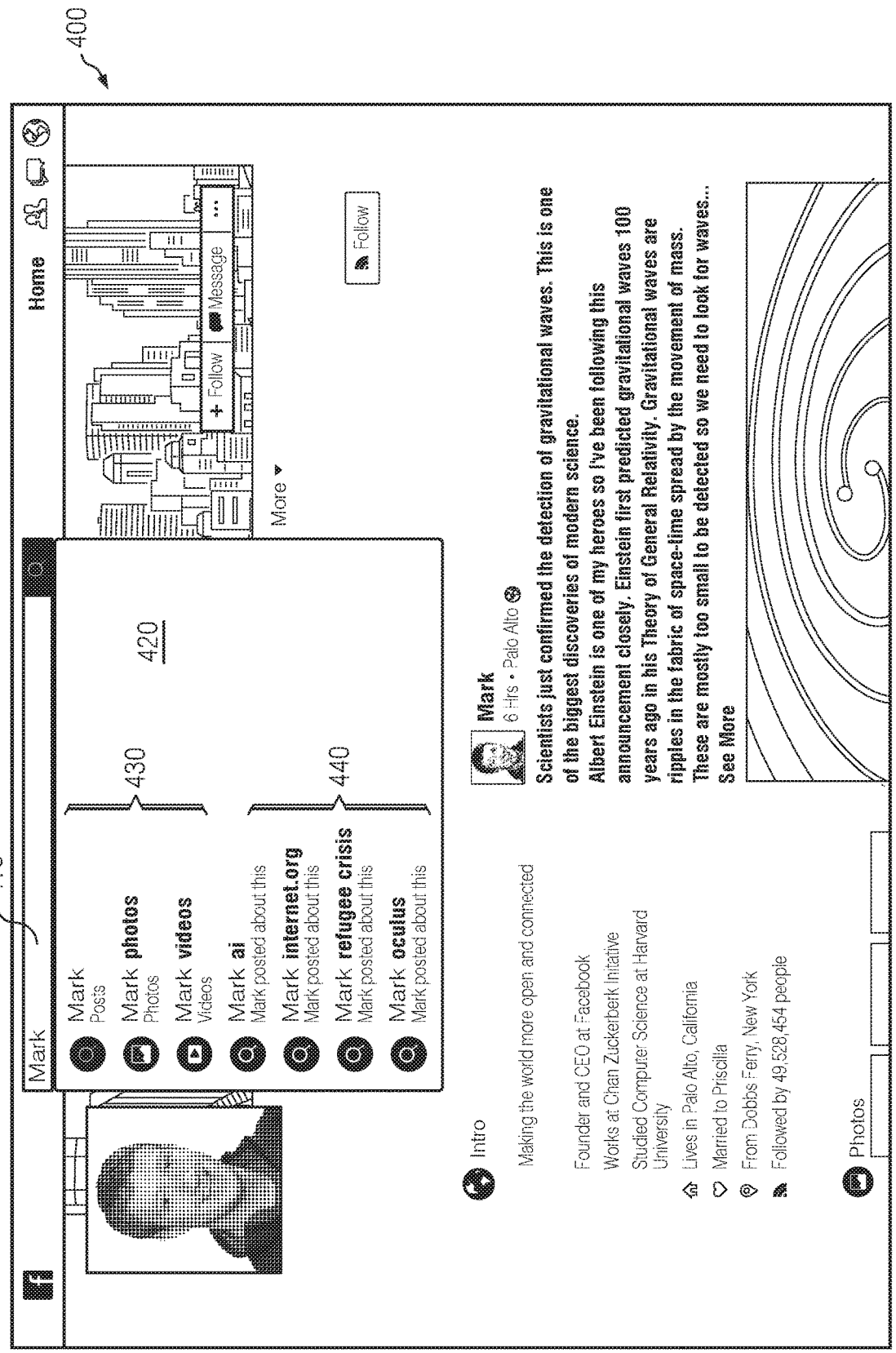
FIG. 4 illustrates an example profile interface for displaying keyword query suggestions.

FIG. 4 illustrates an example profile interface for displaying keyword query suggestions. In this example, the profile interface and the query suggestions both correspond to the same entity. In particular embodiments, a second entity may visit a profile interface 400 associated with Mark, a public figure on the online social network and initiate a search from this interface by clicking on the query field 410. The social-networking system 160 may determine that the second entity is currently accessing the profile interface 400 of Mark and may automatically fill the query field 410 with the term "Mark." When the second entity clicks on the query field 410, a dropdown menu 420 comprising a list of suggested queries may be displayed. The list may comprise content type queries 430, each, if executed by a search engine, may search the online social network for a particular type of content associated with the entity named in the query (e.g., Mark's posts, Mark's photos, Mark's videos). The list may further comprise keyword queries 440, each comprising a stored candidate keyword (e.g., "ai," "internet.org," "refugee crisis," "oculus") and a reference to the entity associated with the candidate keywords (e.g., "Mark"). Each suggested keyword query entry may further comprise a brief description of the source based on which the corresponding keyword is generated (e.g. "Mark posted about this"). The candidate keywords included in the suggested keyword queries may have been generated based on n-grams extracted from Mark's posts and either stored in one or more data stores 164 or cached on a client system 130 associated with the second entity by the social-networking system 160 ahead of time. The social-networking system 160 may have ranked the candidate keywords based on one or more criteria and assigned a suggested keyword query comprising a higher-ranked candidate keyword a higher position on the dropdown menu. The second entity may be able to click on one of the suggested keyword queries to conduct a search against the online social network with the query clicked on. Although FIG. 4 illustrates displaying, in an interface corresponding to a first entity, particular keyword query suggestions associated with an entity in a particular manner, this disclosure contemplates displaying, in an interface corresponding to a first entity, any suitable keyword query suggestions associated with an entity in any suitable manner.

Figure 5A:
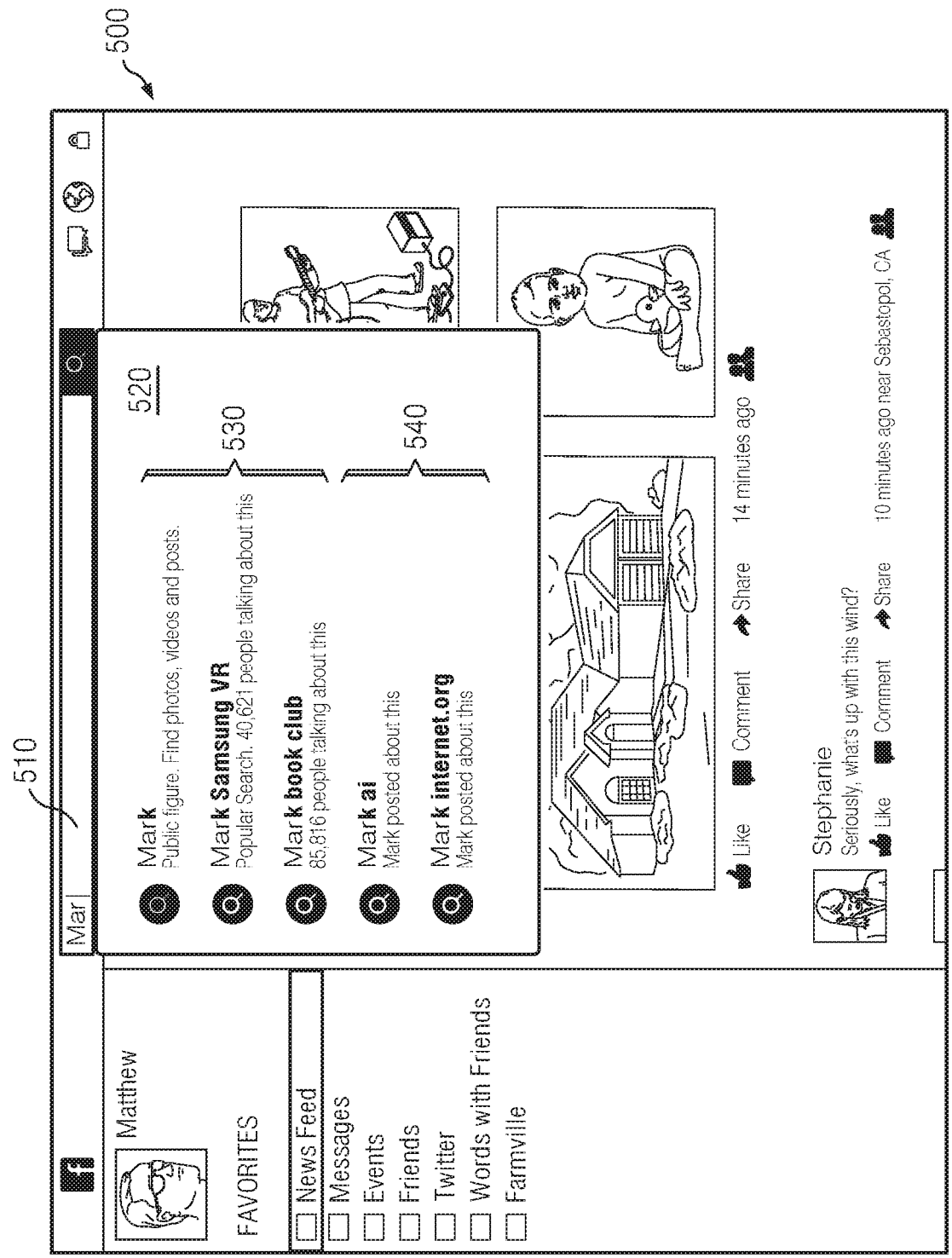
FIGS. 5A-5B illustrate an example newsfeed interface for displaying keyword query suggestions.
Figure 5B:
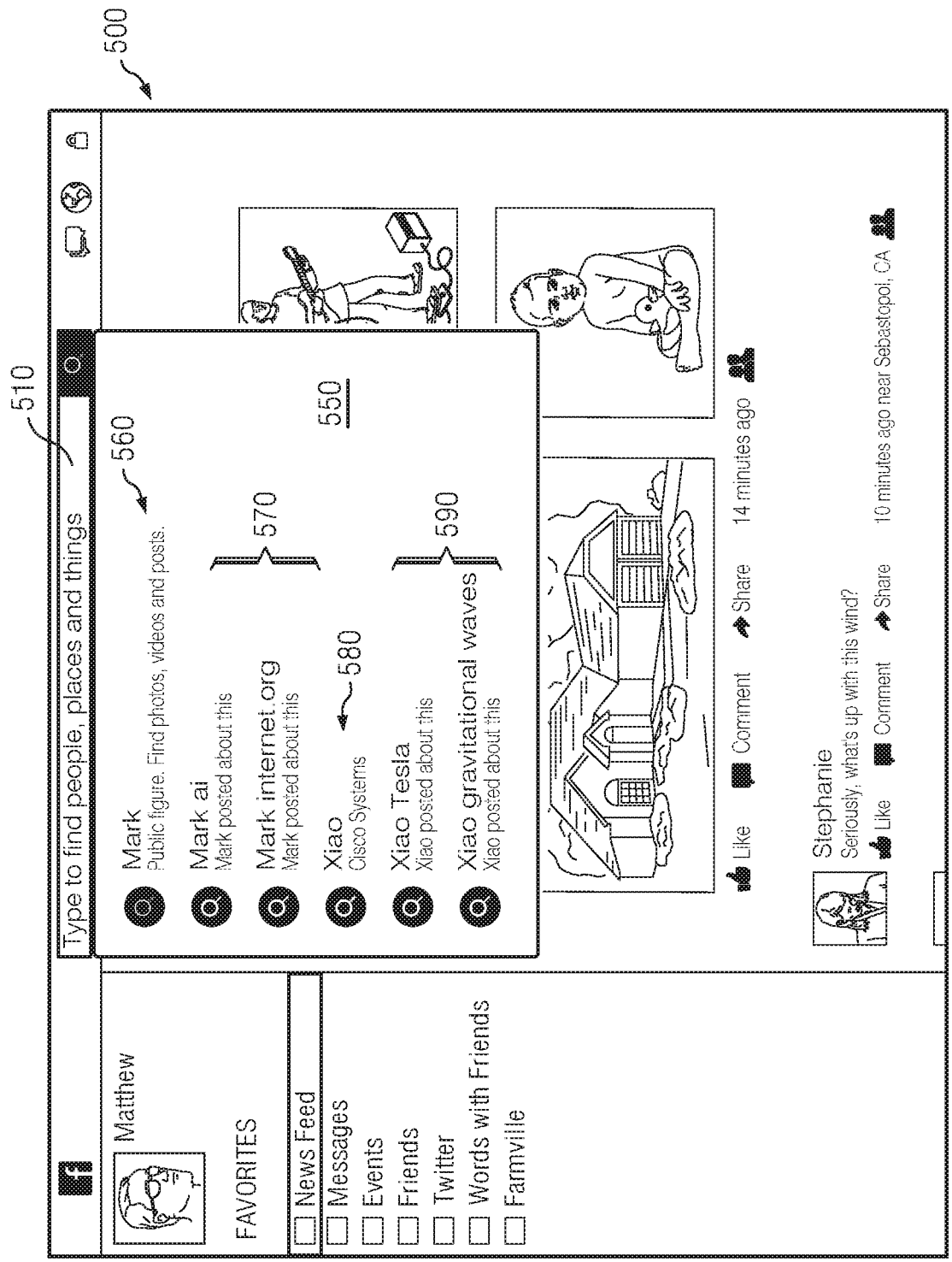

FIGS. 5A-5B illustrate an example newsfeed interface for displaying keyword query suggestions. In this example, the newsfeed interface and the query suggestions correspond to different entities. A second entity, Matthew, may stay on his own newsfeed interface 500 and initiate a search from this interface by clicking on the query field 510. In a first scenario as illustrated by FIG. 5A, the second entity may type in the query field 510 a particular partial query "Mar." The social-networking system 160, as part of its typehead functionality, may parse the partial query to identify at least the n-gram "Mar" and determine that the identified n-gram corresponds to an entity node corresponding to Mark. A dropdown menu 520 comprising a list of suggested queries may then be displayed. The list may comprise user and trending topic queries 530, each comprising a query string and a brief description of the query. The list may also comprise keyword queries 540, each comprising a candidate keyword (e.g., "ai," "internet.org") generated based on a n-gram extracted from posts associated with Mark and a reference to Mark (e.g., "Mark"). Note that the current dropdown menu 520 may only have two slots for displaying suggested queries with candidate keywords generated based on posts. Therefore, the social-networking system 160 may only display suggested keyword queries comprising the keywords ranked top two among all stored candidate keywords associated with Mark. The second entity may be able to click on one of the suggested keyword queries to conduct a search against the online social network with the query clicked on.

In a second scenario as illustrated by FIG. 5B, the second entity, Matthew, may click on the query field 510 associated with the newsfeed interface 500 without typing in a partial query. The social-networking system 160 may access a search history of the second entity and determine that the second entity has recently searched for Mark and Xiao. Based on this determination, the social-networking system 160 may send to a client system 130 of the second entity for display a dropdown menu 550, which comprises a list of suggested queries. The list may comprise user queries 560 and 580, and keyword queries 570 and 590. The keyword queries 570 and 590 may each comprise a keyword (e.g., "ai," "internet.org," "Tesla," "gravitational waves") and a reference to the user associated with the keyword (e.g., "Mark," "Xiao"). Here, the suggested queries associated with Mark may be displayed above suggested queries associated with Xiao because the second entity may have more recently searched for Mark than Xiao. The second entity may be able to click on one of the suggested keyword queries to conduct a search against the online social network with the query clicked on. Although FIGS. 5A-5B illustrate displaying, in an interface unrelated to a first entity, keyword query suggestions associated with the first entity in a particular manner, this disclosure contemplates displaying, in an interface unrelated to a first entity, keyword query suggestions associated with the first entity in any suitable manner.

Figure 6:
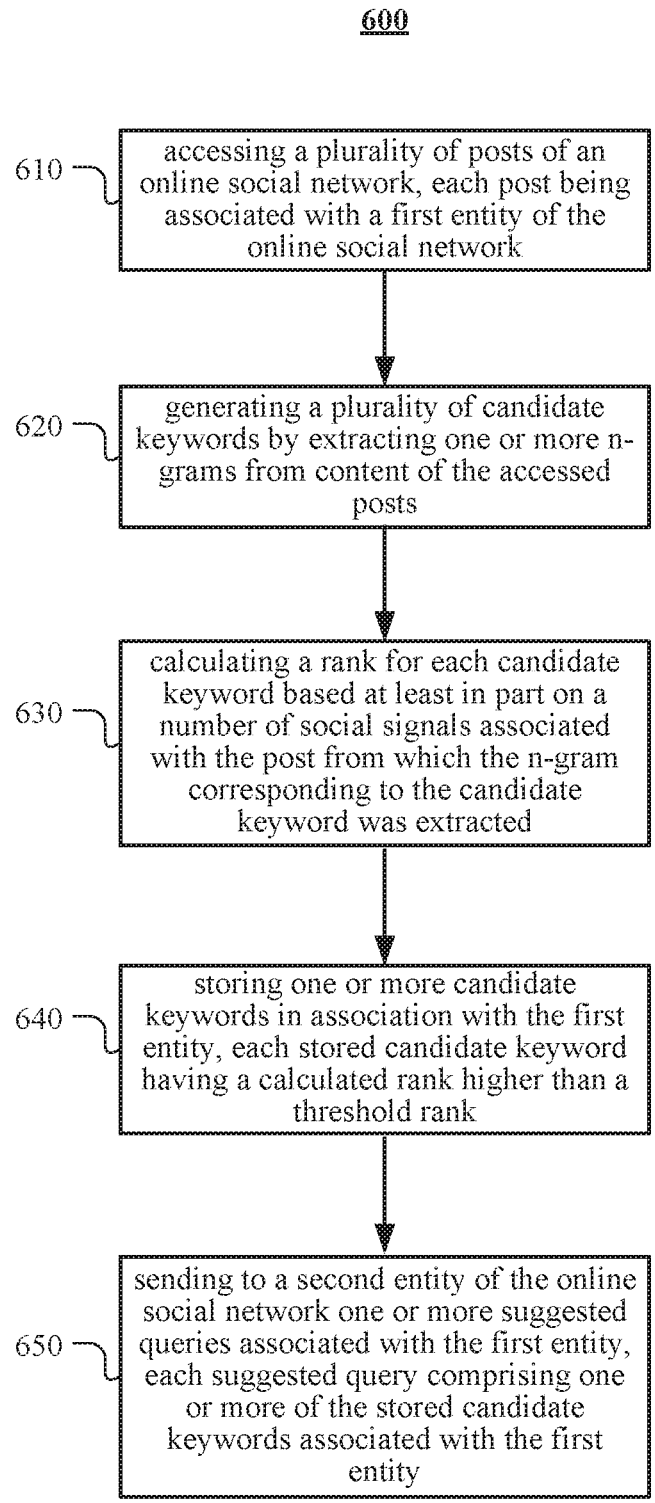
FIG. 6 illustrates an example method 600 for providing customized keyword query suggestions related to particular entities of an online social network.

FIG. 6 illustrates an example method 600 for providing customized keyword query suggestions related to particular entities of an online social network. The method may begin at step 610, where the social-networking system 160 may access a plurality of posts of an online social network, each post being associated with a first entity of the online social network. At step 620, the social-networking system 160 may generate a plurality of candidate keywords by extracting one or more n-grams from content of the accessed posts. At step 630, the social-networking system 160 may calculate a rank for each candidate keyword based at least in part on a number of social signals associated with the post from which the n-gram corresponding to the candidate keyword was extracted. At step 640, the social-networking system 160 may store one or more candidate keywords in association with the first entity, each stored candidate keyword having a calculated rank higher than a threshold rank. At step 650, the social-networking system 160 may send to a second entity of the online social network one or more suggested queries associated with the first entity, each suggested query comprising one or more of the stored candidate keywords associated with the first entity. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for providing customized keyword query suggestions related to particular entities of an online social network including the particular steps of the method of FIG. 6, this disclosure contemplates any suitable method for providing customized keyword query suggestions related to particular entities of an online social network including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user may make frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 7:
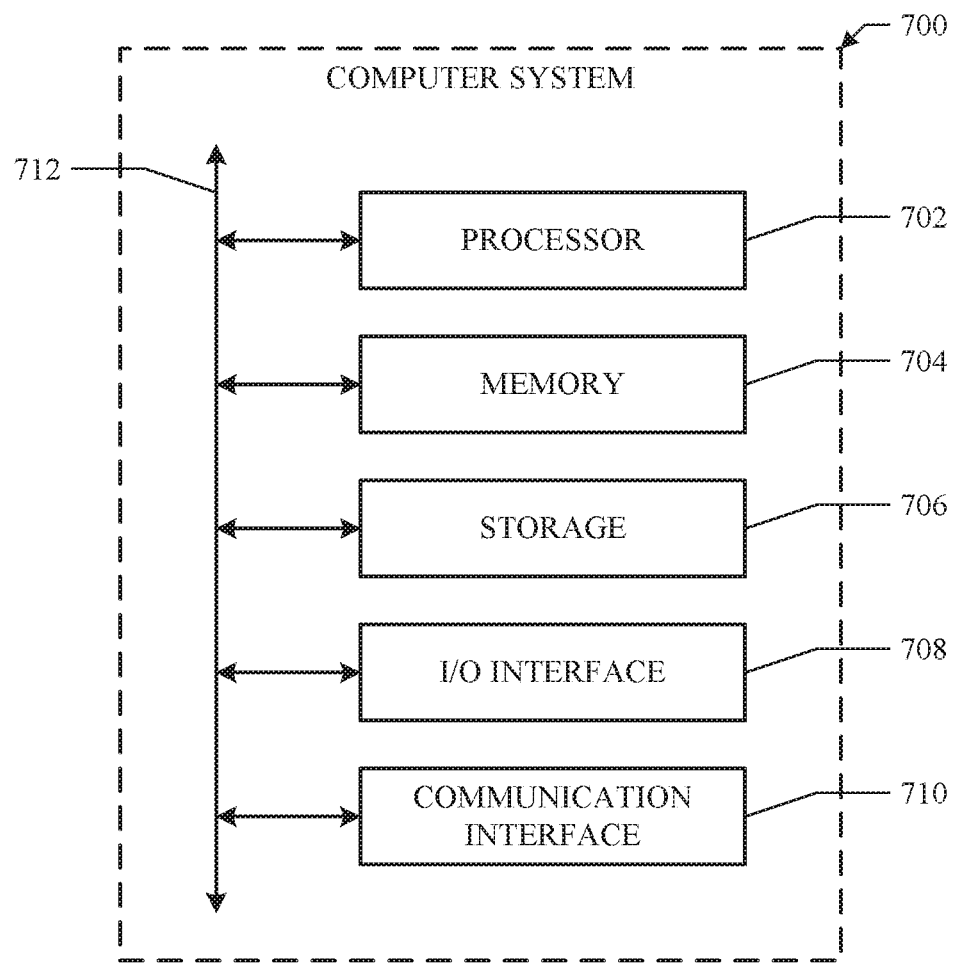
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
    accessing a plurality of posts authored by a plurality of entities of an online social network, each post being associated with a first entity of the online social network;
    generating a plurality of candidate keywords associated with the first entity by extracting one or more n-grams from content of the posts associated with the first entity;
    calculating a rank for each candidate keyword based at least in part on a number of social signals associated with the post from which the n-gram corresponding to the candidate keyword was extracted;
    storing one or more candidate keywords in association with the first entity, each stored candidate keyword having a calculated rank higher than a threshold rank; and
    sending, to a client system of a second entity of the online social network in response to determining that the second entity is currently interacting with an interface of the online social network associated with the first entity, one or more suggested queries associated with the first entity for display on the client system, each suggested query comprising one or more of the stored candidate keywords associated with the first entity.

2. The method of claim 1, further comprising:
    accessing a social graph comprising a plurality of nodes and a plurality of edges connecting the nodes, each of the edges between two of the nodes representing a single degree of separation between them, the nodes comprising:
        a plurality of entity nodes corresponding to a plurality of entities associated with the online social network, respectively, wherein the first entity corresponds to a first entity node of the plurality of entity nodes, and wherein the second entity corresponds to a second entity node of the plurality of entity nodes; and
        a plurality of content nodes corresponding to a plurality of posts of the online social network, respectively, each content node being connected to one or more of the entity nodes by one or more edges.

3. The method of claim 2, further comprising determining that the second entity is currently accessing, via the client system, an interface of the online social network associated with the first entity node.

4. The method of claim 2, further comprising accessing a search history associated with the second entity, the search history comprising a plurality of queries, wherein at least one of the queries of the search history is associated with the first entity node.

5. The method of claim 2, further comprising:
    receiving, from the client system of the second entity, an unstructured text query;
    parsing the text query to identify one or more n-grams; and
    determining that at least one of the identified n-grams corresponds to the first entity node.

6. The method of claim 1, wherein the accessed posts comprise posts generated within a specified timeframe.

7. The method of claim 1, wherein a number of posts accessed is the smaller of:
    a specified number of posts; or
    a total number of posts associated with the first entity of the online social network.

8. The method of claim 1, wherein generating the plurality of candidate keywords comprises:
    extracting one or more n-grams from the content of the accessed posts;
    calculating a relevance score for each extracted n-gram; and generating a candidate keyword corresponding to each n-gram having a calculated relevance score greater than a threshold relevance score.

9. The method of claim 1, wherein generating the plurality of candidate keywords further comprises:
accessing one or more images associated with each of one or more of the accessed posts;
identifying one or more n-grams corresponding to one or more features of each accessed image; and
generating a candidate keyword for each of one or more of the identified n-grams.

10. The method of claim 1, wherein the social signals associated with each post comprise one or more of:
an accessing or viewing of the post;
a comment on the post;
a sharing of the post; or
a liking of the post, the comment on the post, or the sharing of the post.

11. The method of claim 1, wherein calculating the rank for each candidate keyword is further based on analysis of the candidate keyword according to a language model.

12. The method of claim 1, wherein calculating the rank for each candidate keyword is further based on a time of creation associated with the post from which the n-gram corresponding to the candidate keyword was extracted.

13. The method of claim 1, wherein calculating the rank for each candidate keyword comprises:
determining that a first candidate keyword appears in a list of trending-topic keywords; and
up-ranking the first candidate keyword based on the determination.

14. The method of claim 1, wherein calculating the rank for each candidate keyword comprises:
determining that a first candidate keyword appears in more than one accessed posts associated with the first entity of the online social network;
calculating a number of accessed posts comprising the first candidate keyword; and
up-ranking the first candidate keyword based on the calculated number of accessed posts.

15. The method of claim 1, wherein calculating the rank for each candidate keyword comprises, for a first candidate keyword:
determining that one or more n-grams corresponding to a particular number of second candidate keywords, respectively, were extracted from the post from which the n-gram corresponding to the first candidate keyword was extracted;
determining that the particular number of second candidate keywords each has a higher rank than the first candidate keyword; and
down-ranking the first candidate keyword based on the determinations.

16. The method of claim 1, wherein each accessed post is associated with a privacy setting defining a visibility of the post that is visible to at least the second entity.

17. The method of claim 1, wherein storing the one or more candidate keywords in association with the first entity comprises storing the candidate keywords in one or more data stores associated with the online social network.

18. The method of claim 1, wherein storing the one or more candidate keywords in association with the first entity comprises storing the candidate keywords on a local cache of the client system of the second entity.

19. One or more computer-readable non-transitory storage media embodying software that is operable when executed to:
access a plurality of posts authored by a plurality of entities of an online social network, each post being associated with a first entity of the online social network;
generate a plurality of candidate keywords associated with the first entity by extracting one or more n-grams from content of the posts associated with the first entity;
calculate a rank for each candidate keyword based at least in part on a number of social signals associated with the post from which the n-gram corresponding to the candidate keyword was extracted;
store one or more candidate keywords in association with the first entity, each stored candidate keyword having a calculated rank higher than a threshold rank; and
send, to a client system of a second entity of the online social network in response to determining that the second entity is currently interacting with an interface of the online social network associated with the first entity, one or more suggested queries associated with the first entity for display on the client system, each suggested query comprising one or more of the stored candidate keywords associated with the first entity.

20. A system comprising: one or more processors; and a non-transitory memory coupled to the processors comprising instructions executable by the processors, the processors operable when executing the instructions to:
access a plurality of posts authored by a plurality of entities of an online social network, each post being associated with a first entity of the online social network;
generate a plurality of candidate keywords associated with the first entity by extracting one or more n-grams from content of the posts associated with the first entity;
calculate a rank for each candidate keyword based at least in part on a number of social signals associated with the post from which the n-gram corresponding to the candidate keyword was extracted;
store one or more candidate keywords in association with the first entity, each stored candidate keyword having a calculated rank higher than a threshold rank; and
send, to a client system of a second entity of the online social network in response to determining that the second entity is currently interacting with an interface of the online social network associated with the first entity, one or more suggested queries associated with the first entity for display on the client system, each suggested query comprising one or more of the stored candidate keywords associated with the first entity.

* * * * *